(12) United States Patent
Klaassen

(10) Patent No.: US 9,539,982 B2
(45) Date of Patent: Jan. 10, 2017

(54) BELT BUCKLE SWITCH

(71) Applicant: TRW Automotive GmbH, Alfdorf (DE)

(72) Inventor: Jens Klaassen, Alfdorf (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/440,372

(22) PCT Filed: Oct. 30, 2013

(86) PCT No.: PCT/EP2013/003264
§ 371 (c)(1),
(2) Date: May 4, 2015

(87) PCT Pub. No.: WO2014/067657
PCT Pub. Date: May 8, 2014

(65) Prior Publication Data
US 2015/0298651 A1    Oct. 22, 2015

(30) Foreign Application Priority Data

Nov. 5, 2012 (DE) .................. 10 2012 021 482

(51) Int. Cl.
*B60R 22/48* (2006.01)

(52) U.S. Cl.
CPC ........ *B60R 22/48* (2013.01); *B60R 2022/4816* (2013.01)

(58) Field of Classification Search
CPC .... B60R 2022/4816; B60R 22/48; H01H 1/42
USPC ......... 200/61.58 B, 254, 61.62; 24/633, 641; 340/457
See application file for complete search history.

(56) References Cited

U.S. PATENT DOCUMENTS

| | | | | |
|---|---|---|---|---|
| 3,833,781 | A | * | 9/1974 | Rumpf .................. B60R 22/48 200/254 |
| 4,012,612 | A | | 3/1977 | Loomba |
| 4,608,469 | A | * | 8/1986 | Doty ..................... B60R 22/48 200/275 |
| 4,754,105 | A | * | 6/1988 | Doty .................. A44B 11/2523 200/61.58 B |
| 2005/0146420 | A1 | | 7/2005 | Ebert |
| 2009/0049665 | A1 | | 2/2009 | Maziere et al. |
| 2014/0367234 | A1 | | 12/2014 | Ebert |

FOREIGN PATENT DOCUMENTS

| | | |
|---|---|---|
| DE | 202010001738 | 7/2010 |
| DE | 202012001867 | 6/2012 |
| EP | 1577178 | 9/2005 |
| WO | 2010/040421 | 4/2010 |

* cited by examiner

*Primary Examiner* — Edwin A. Leon
(74) *Attorney, Agent, or Firm* — Tarolli, Sundheim, Covell & Tummino LLP

(57) ABSTRACT

A belt buckle including locking status detection, having a switching contact and a mating contact, wherein the switching contact and the mating contact are electrically conducting parts of a switch. The switching contact contacts the mating contact in an intermediate position of the switch in a first contact area at the mating contact and in an end position of the switch in a second contact area at the mating contact distant from the first contact area by a displacing distance.

21 Claims, 4 Drawing Sheets

BELT BUCKLE SWITCH

RELATED APPLICATIONS

This application corresponds to PCT/EP2013/003264 filed Oct. 30, 2013, which claims the benefit of German Application No. 10 2012 021 482.0, filed Nov. 5, 2012, the subject matter, of which are incorporated herein by reference in their entirety.

BACKGROUND OF THE INVENTION

The invention relates to a belt buckle including locking status detection, comprising a switching contact and a mating contact, the switching contact and the mating contact being electrically conducting parts of a switch.

Locking statue detections in belt buckles for seat belts in automotive vehicles serve for identifying whether the vehicle occupant is properly buckled. For this purpose, it is usually checked whether a belt tongue of a seat belt is locked in the belt buckle. This information is used for optical or acoustic buckling reminder or for a different safety system.

A widespread principle for detecting the locking status is constituted by an electric contact switch which is activated upon insertion of the belt tongue into the belt buckle.

Belt buckles having a micro-switch actuated by the inserted belt tongue are generally known. In this case the electric contact is closed by a resilient contact tab which is made to contact a mating contact. The contact force of the micro-switch corresponds to the spring bias of the mechanical contact tab. It is a drawback of these systems that the contact force is defined by the material and the wall thickness of the contact tab. Further, the contacts of the micro-switch get easily stained which may result in an impaired functioning of the micro-switch.

SUMMARY OF THE INVENTION

It is the object of the invention to provide a switch for a for a locking status detection of a belt buckle having increased contact safety.

This object is achieved in a belt buckle of the aforementioned type in that the switching contact contacts the mating contact in an intermediate position of the switch in a first contact area at the mating contact and in an end position of the switch in a second contact area at the mating contact distant from the first contact area by a displacing distance. The invention is based on the finding that the switch is provided with self-cleaning properties by the displacing distance of the switching contact on the mating contact. During transition from the intermediate position to the end position of the switch, the switching contact moves from the first contact area to the second contact area on the mating contact. The two contacts are rubbing against each other so that stains or impurities of the surface of the contacts are rubbed off. In this way it is ensured that the contacts are self-cleaning and contact each other at any time as provided without stains or impurities deteriorating the conductivity of the contact. The efficiency of self-cleaning depends on the length of the displacing distance, with a long displacing distance resulting in improved self-cleaning.

In an embodiment of the invention the switching contact is configured to be resilient. This ensures that the switching contact detaches from the mating contact, when the switch is not provided in the intermediate or and position. In this way the resilient configuration of the switching contact causes the switch to open.

In a preferred configuration variant, the switching contact includes a contact portion which enters into contact with the mating contact for contacting. The contact portion is formed to be resilient on the switching contact, which in a simple manner allows preventing a loss of contact between the switching contact and the mating contact during the transition from the intermediate position to the end position.

For example, an intermediate portion bordering on the contact portion, especially in V shape, is provided on the switching contact. This form of construction of the switching contact facilitates a resilient configuration of the contact portion and ensures permanent strength of the switching contact, as material fatigue is prevented.

In an especially preferred manner, the angle between the contact portion and the intermediate portion in the intermediate position of the switch is smaller than in the end position of the switch. By utilizing the switching contact in this way the resilient properties of the contact portion are optimally exploited.

In another configuration variant of the invention, the belt buckle includes a closing element arranged on the side of the switching contact facing away from the meting contact. This arrangement enables easy operation of the switching contact by pressure forces only.

For example in the intermediate position of the switch, the intermediate portion is supported on the closing element and thus permits operating the switching contact without influencing the resilient properties of the contact portion.

Preferably, the switching contact includes a connecting area in which the contact portion borders on the intermediate portion, the connecting area resting on the closing element in the end position of the switch. This arrangement constitutes a simple though effective option for locking the switch and thus increases the contact safety of the switch.

In another configuration of the invention, the belt buckle includes a base member and a slide guided on the base member, wherein the closing element is connected to and especially formed integrally with the slide. The design of a slide connected to the closing element provides a guiding of the closing element and at the same time constitutes an option for operating the closing element.

The base member could include a spring element, especially a helical compression spring, which could load the slide element by means of the slide with a force in the direction of its position in the end position of the switch. In this way, the contact safety would be further increased, as the switch would always return to its end position without any external action of force.

In another embodiment of the invention, the mating contact is configured to be resilient. This further extends the displacing distance.

Another embodiment provides the base member to include are intermediate wall between the mating contact and the switching contact, the mating contact being biased against the intermediate wall in the intermediate position of the switch. The biasing of the mating contact results in the fact that a sufficiently high contact force is provided from the moment of contacting the contacts so that any loose contact is excluded.

In the final position of the switch the switching contact, for example, loads the mating contact with a force against the spring force of the mating contact. This results in an increase in the contact force and thus increases the contact safety of the switch.

According to a further configuration of the invention, the base member has at least two internal electrically conducting connecting faces, wherein each of the switching contact and the mating contact extends from one of the connecting faces and is especially formed integrally with a respective one of the connecting faces. Switching and mating contacts formed in this way can be manufactured at low cost and enable simple mounting on the base member without their resilient properties being impaired.

In a configuration variant of the invention, the base member includes a stress relief area having ribs to enable stress relief of a cable contacting the switch in a component-efficient manner.

BRIEF DESCRIPTION OF THE DRAWINGS

Further features and advantages of the invention are evident from the following description and from the enclosed drawings which are referred to. The drawings show in.

DESCRIPTION OF EMBODIMENT

Figure 1:
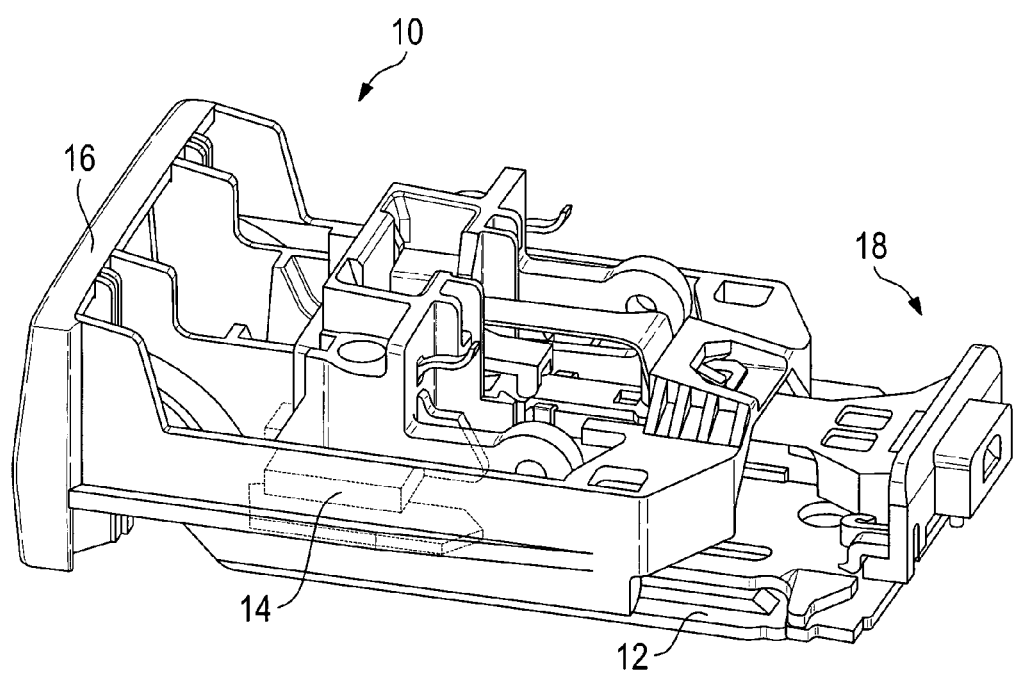
FIG. 1 a belt buckle comprising a switch module for locking status detection according to the invention, FIG. 2 a perspective view of the switch module according to the invention, and FIGS. 3a to 3c a switch of the switch module according to FIG. 2 in the open, intermediate and end positions.

FIG. 1 shows a belt buckle 10 comprising a frame 12, an ejector 14, an ejecting key 16 and a switch module 18 for locking status detection. A housing surrounding the functional parts is not shown for the sake of clarity.

Figure 2:
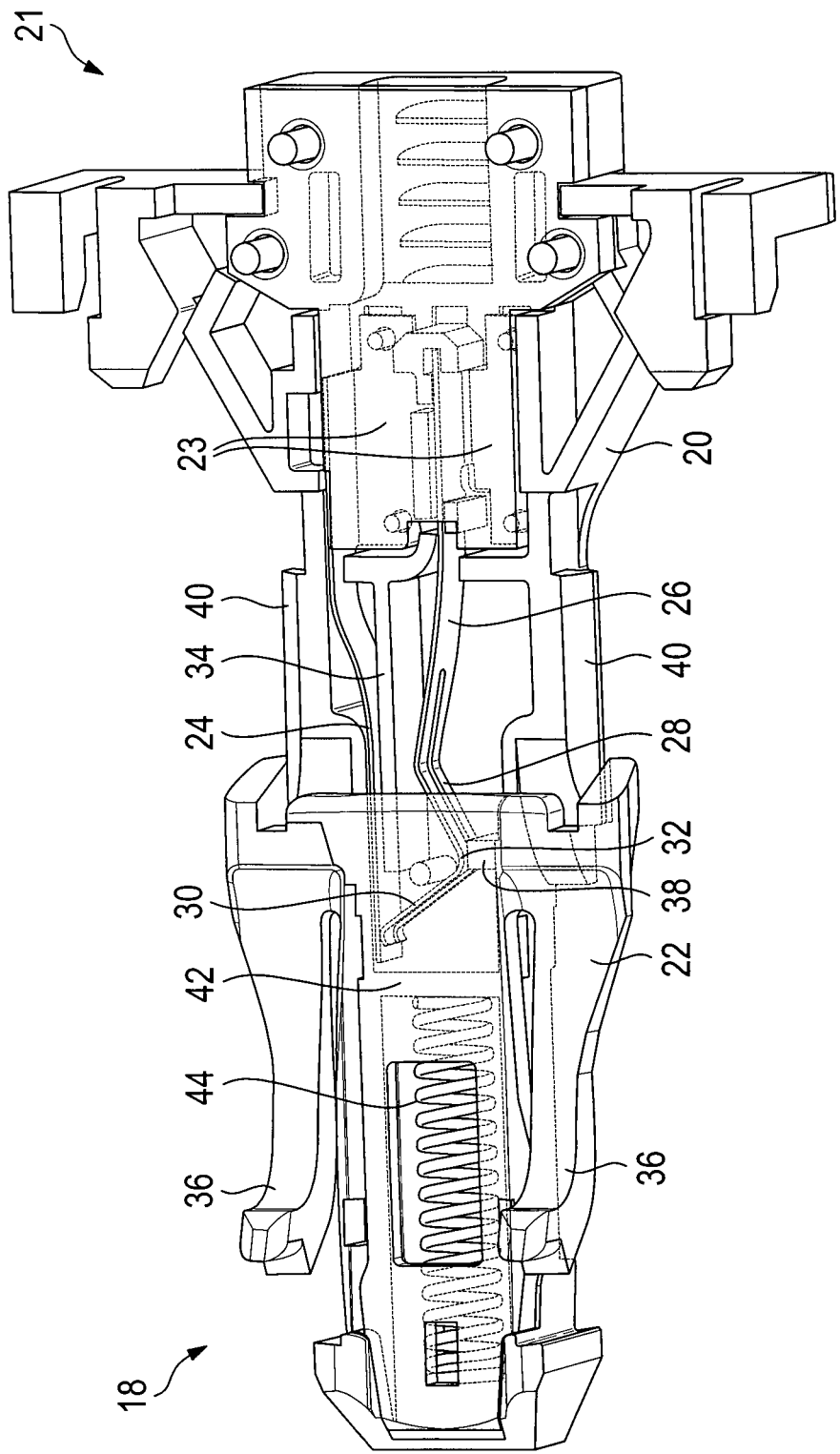

FIG. 2 shows the switch module 18 individually. The base member 20 of the switch module 18 can be seen with one end thereof being in the form of a stress relief area 21 including ribs. In the central area of the base member 20 a switch is arranged and a slide 22 is movably arranged at the base member 20 in this area.

The switch substantially consists of connecting faces 23, a mating contact 24 and a switching contact 26 which are made of electrically conducting material. The connecting faces 23 are fastened to the base member 20 and each of the mating contact 24 and the switching contact 26 extends from one of the connecting faces 23 from the side facing away from the stress relief area 21. Preferably, the mating contact 24 and the switching contact 26 are formed integrally with a respective one of the connecting faces 23. Starting from the connecting faces 23, the switching contact 26 initially has an intermediate portion 28 articulated away from the mating contact 24. A contact portion 30 is adjacent to the latter, wherein the area in which the intermediate portion 28 borders on the contact portion 30 is referred to as connecting area 32. The contact portion 30 tapers to the mating contact 24 at an angle and is articulated from the intermediate portion 28; preferably the intermediate portion and the contact portion form a V-shape.

In addition, the base member 2 includes an intermediate wall 34 extending between the mating contact 24 and the switching contact 26 in the area of the switch. The length of the intermediate wall 34 is smaller than the length of the mating contact and that of the switching contact so that, starting from the connecting faces 23, it does not completely separate the two contacts. Thus an area in which the mating contact 24 and the switching contact 26 may contact each other is provided on the side of the intermediate wall 34 facing away from the connecting faces 23.

On the slide 22 operating portions 36 and a closing element 38 are formed. They are preferably formed integrally with the slide 22. The operating portions 36 extend in the direction of the end of the base member 20 facing the stress relief area 21. The closing element 38 is arranged on the side of the switching contact 26 facing away from the mating contact 24. The slide 22 and the closing element 38 are formed to be movable along the two contacts 24, 26. For this purpose, guides 40 for guiding the slide 22 and thus also the closing element 38 are provided at the base member 20. Adjacent to the switch, the base member 20 includes an opposite wall 42 on which a spring element 44 preferably in the form of a helical compression spring is supported by one end. The spring element 44 is arranged with its other end on the end of the slide 22 facing away from the connecting faces 23 so that the spring element 44 loads the slide 22 with a force toward the end of the base member 20 facing the stress relief area 21.

Figure 3A:
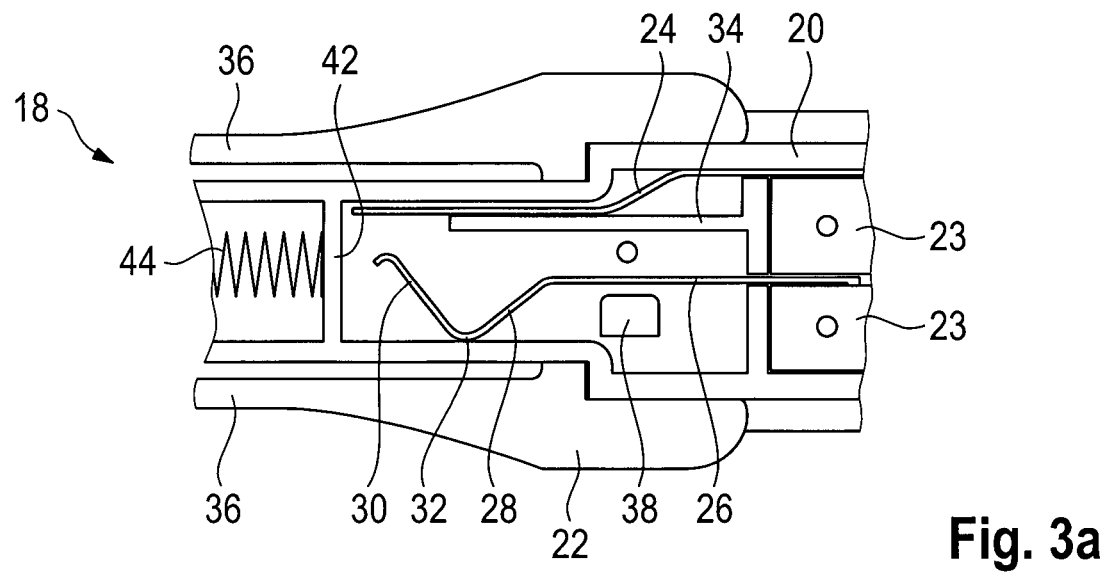
Figure 3B:
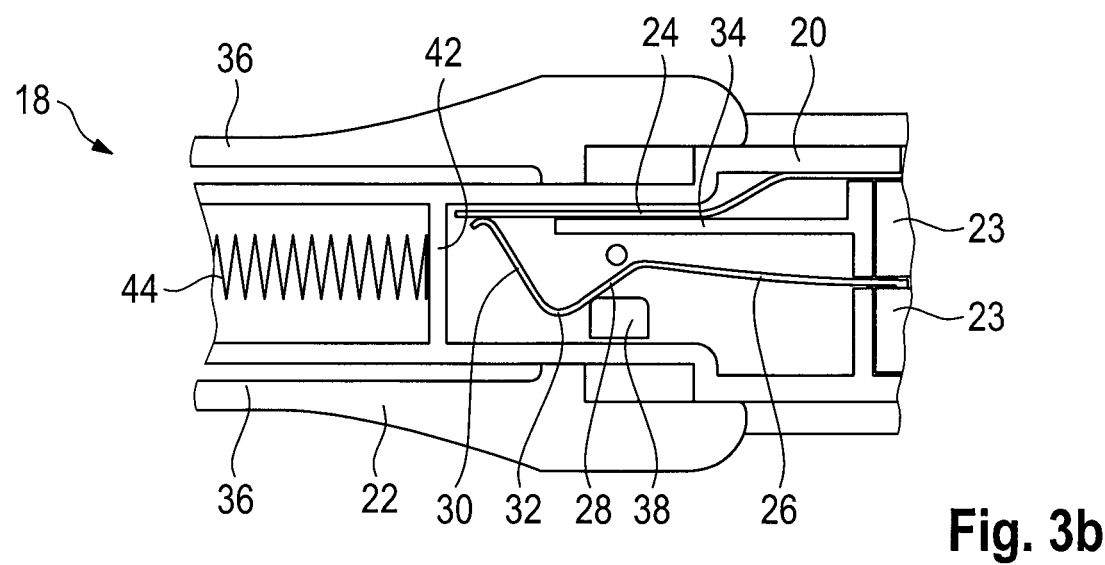
Figure 3C:
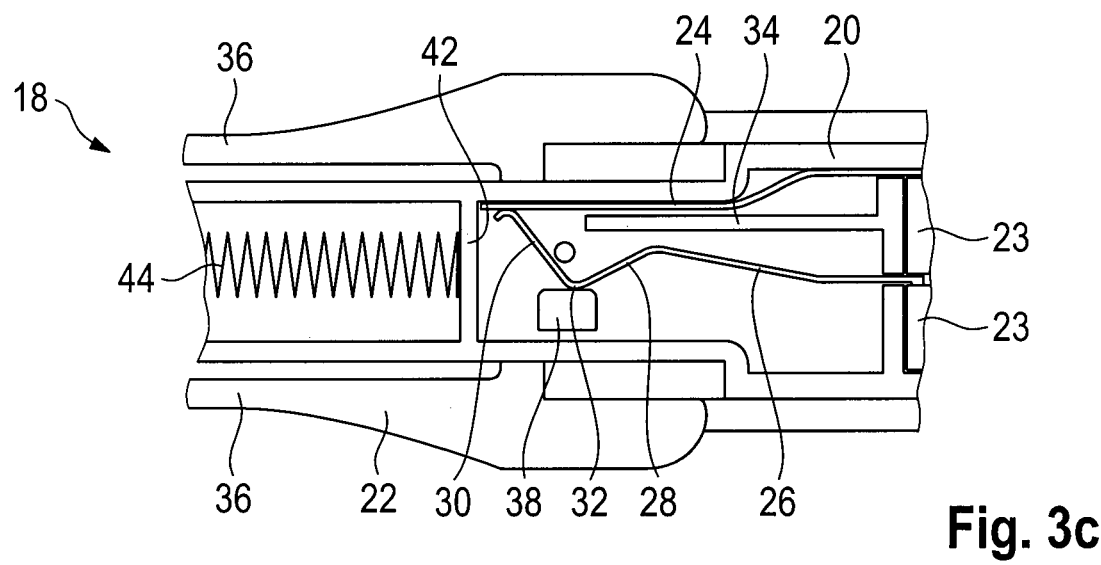

The functioning of the switch is illustrated by way of the FIGS. 3a to 3c. In FIG. 3a the open position of the switch is shown in which the mating contact 24 and the switching contact 26 are not in contact and have the maximum distance from each other. This state corresponds to an inserted belt tongue. The switching contact 26 is provided in the standard position and the connecting area 32 rests on the base member 20. The mating contact 24 is biased against the intermediate wall 34 and projects from the same with its free end. The closing element 38 does not contact the switching contact 26 and is provided in a position in which it is closest to the connecting faces 23. The slide 36 connected to the closing element 38 is thus provided in a position in which the spring element 44 is strongly compressed.

The intermediate position of the switch illustrated in FIG. 3b is reached, starting from the open position, by the fact that the spring element 44 guides the slide 36 and thus the closing element 38 away from the connecting faces 23. This is possible by removing the be tongue. The closing element 38 gets into contact with the intermediate portion 28 and, due to the inclined configuration of the intermediate portion 28, moves the switching contact 26 in the direction of the mating contact 24. This movement is carried out until the connecting area 32 enters into contact with a first contact area of the mating contact 24 and thus closes the switch. Accordingly, the switching contact 26 is elastically tensioned.

The closing element 38 further continues its movement driven by the spring element 44 until the end position of the switch is reached, as is shown in FIG. 3c, for example. The closing element 38 continues exerting force on the switching contact 26. On the one hand, this force causes the mating contact 24 to be moved against its springing direction by the switching contact 26. On the other hand, the contact portion 30 moves on the mating contact 24 by a displacing distance so that the contact is made in a second contact area now. The contact portion 30 accordingly yields elastically vis-à-vis the intermediate portion 28 so that the angle between the intermediate portion 28 and the contact portion 30 is increased. In this position the connecting area 32 rests on the closing element 38 and thus prevents the contact portion 30 from springing back, which would result in undesired opening of the switch.

The switch is part of a circuit for locking status detection. The switch is contacted by means of an at least double-wire cable, each wire being connected to either of the connecting faces 23. The cable is guided through the stress relief area 21 at the base member so as to avoid damage of the connection between the cable and the connecting faces 23 in the case of strong movements of the cable.

The locking status detection functions as follows: When the seat belt is unlocked, i.e. unless the belt tongue (not shown) of the seat belt is in the belt buckle 10, the switch is provided in its end position and is closed. When the seat belt is closed—this means that the belt tongue is inserted in the belt buckle 10—, the belt tongue operates the slide 22 by means of the ejector 14 engaging in the operating portions 36 and moves the sire against the spring force of the spring element 44 in the direction of the contact faces 23. If the belt tongue is completely inserted and the belt buckle 10 is locked, the switch is provided in its open position, as is shown in FIG. 3a. Thus a closed switch signals an unlocked seat belt, whereas an open switch indicates the proper locking of the seat belt. The position of the switch can be read out by means of the circuit and thus the locking status of the seat belt can be determined.

Instead of the configuration of the switch in the configuration of a normally closed contact as described here, it is also possible to design the same in the configuration of a normally open contact.

The invention claimed is:

1. A belt buckle (10) including locking status detection, comprising:
   a switching contact (26) and a mating contact (24), the switching contact (26) and the mating contact (24) being electrically conducting parts of a switch, wherein the switching contact (26) contacts the mating contact (24) in an intermediate position of the switch in a first contact area at the mating contact (24) and in an end position of the switch in a second contact area at the mating contact (24) distant from the first contact area by a displacing distance, and
   a closing element that engages the switching contact to move the switching contact into contact with the mating contact, the closing element moving into engagement with the switching contact upon removal of a tongue from the belt buckle.

2. The belt buckle according to claim 1, wherein the closing element (38) is adapted to deform the switching contact.

3. The belt buckle according to claim 1, wherein the switching contact (26) is configured to be resilient.

4. The belt buckle according to claim 1, wherein the switching contact (26) includes a contact portion (30) which enters into contact with the mating contact (24) for contacting, the contact portion (30) being configured to be resilient at the switching contact (26).

5. The belt buckle according to claim 4, wherein the switching contact (26) includes an intermediate portion (28) which borders on the contact portion (30) while especially forming a V-shape.

6. The belt buckle according to claim 5, wherein the angle formed between the contact portion (30) and the intermediate portion (28) in the intermediate position of the switch is smaller than in the end position of the switch.

7. The belt buckle according to claim 1, wherein the closing element (38) is arranged on the side of the switching contact (26) facing away from the mating contact (24).

8. The belt buckle according to claim 5, wherein in the intermediate position of the switch the intermediate portion (28) is supported on the closing element (38).

9. The belt buckle according to claim 7, wherein the switching contact (26) includes a connecting area (32) in which the contact portion (30) borders on the intermediate portion (28), wherein the connecting area (32) rests on the closing element (38) in the end position of the switch.

10. The belt buckle according to claim 7, wherein the belt buckle (10) includes a base member (20) and a slide (36) guided on the base member (20), wherein the closing element (38) is connected to and especially integrally formed with the slide (36).

11. The belt buckle according to claim 9, wherein the base member (20) includes a spring element (44), especially a helical compression spring, which loads the closing element (38) by means of the slide (36) with a force in the direction of its position in the end position of the switch.

12. The belt buckle according to claim 1, wherein the mating contact (24) is formed to be resilient.

13. The belt buckle according to claim 12, wherein the belt buckle comprises a base member (20) having an intermediate wall (34) between the mating contact (24) and the switching contact (26), the mating contact (24) being biased against the intermediate wall (34) in the intermediate position of the switch.

14. The belt buckle according to claim 12, wherein the switching contact (26) loads the mating contact (24) in the end position of the switch with a force against the spring force of the mating contact (24).

15. The belt buckle according to claim 1, wherein the belt buckle comprises a base member (20) having at least two inner electrically conducting connecting faces (22), wherein each of the switching contact (26) and the mating contact (24) extends from one of the connecting faces (22) and is especially formed integrally with a respective one of the connecting faces (22).

16. The belt buckle according to claim 1, wherein the belt buckle comprises a base member (20) including a stress relief area (21) having ribs.

17. A belt buckle having locking status detection, comprising:
   a switch having an intermediate position and an end position
   an electrically conductive switching contact forming a first part of the switch;
   an electrically conductive mating contact forming a second part of the switch, the mating contact having a first contact area and a second contact area spaced apart from the first contact area, the switching contact contacting the first contact area when the switch is in the intermediate position and contacting the second contact area when the switch is in the end position; and
   a closing element that engages the switching contact to move the switching contact into contact with the mating contact at the first and second contact areas, the closing element moving into engagement with the switching contact upon removal of a tongue from the belt buckle.

18. The belt buckle according to claim 17, wherein the closing element forces the switching contact into contact with the mating contact when the tongue is removed from the belt buckle.

19. The belt buckle according to claim 17 further comprising a base member and a slide guided for slidable movement relative to the base member, the closing member being fixed for movement with the slide.

20. The belt buckle according to claim 19 further comprising a helical compression spring that is arranged to engage the slide to bias the closing element in a direction opposite to a direction that the tongue is inserted into the belt buckle.

21. The belt buckle according to claim 17, wherein the closing element is arranged on a side of the switching contact that faces away from the mating contact.

* * * * *